United States Patent [19]

Kruse et al.

[11] Patent Number: 4,951,247
[45] Date of Patent: Aug. 21, 1990

[54] DATA EXCHANGE SYSTEM COMPRISING A PLURALITY OF USER TERMINALS EACH CONTAINING A CHIP CARD READING DEVICE

[75] Inventors: Dietrich Kruse; Albrecht Beutelspacher, both of Ottobrunn; Annette-Gabriele Kersten, Wiesbaden, all of Fed. Rep. of Germany

[73] Assignee: Siemens Aktiengesellschaft, Berlin and Munich, Fed. Rep. of Germany

[21] Appl. No.: 164,480

[22] Filed: Mar. 4, 1988

[30] Foreign Application Priority Data

Mar. 4, 1987 [DE] Fed. Rep. of Germany ....... 3706958

[51] Int. Cl.$^5$ ............................................. G06F 3/00
[52] U.S. Cl. ................................ 364/900; 364/949.71; 364/927.8; 364/942.8; 364/965.76
[58] Field of Search ... 364/200 MS File, 900 MS File; 235/380

[56] References Cited

U.S. PATENT DOCUMENTS

| 4,224,666 | 9/1980 | Giraud | 364/200 |
| 4,295,039 | 10/1981 | Stuckert | 235/380 |
| 4,679,236 | 7/1987 | Davies | 235/380 X |
| 4,746,788 | 5/1988 | Kawana | 235/380 |
| 4,786,790 | 11/1988 | Kruse et al. | 235/380 |
| 4,819,204 | 4/1989 | Schrenk | 235/380 X |

*Primary Examiner*—Thomas M. Heckler
*Attorney, Agent, or Firm*—Hill, Van Santen, Steadman & Simpson

[57] ABSTRACT

A secret cipher (Ki) that is the same for all user terminals is formed of two sub-components (KTi, KT'i) whereof the one sub-component (KTi) is deposited in an erasable, programmable read-only memory (EEPROM). For the second sub-component (KT'i), an encoded data block (E(KT'i)) is transmitted from the outside to a decoder means (DEC) provided in the security module, the decoded output signal thereof being deposited as second sub-component (KT'i) in a first sub-area of a write-read memory (RAM) present in the security module of the user terminal. An overall cipher (Ki) is calculated from the two sub-components (KTi, KT'i) and the result is deposited in a second sub-area of the write-read memory (RAM).

5 Claims, 2 Drawing Sheets

4,951,247

DATA EXCHANGE SYSTEM COMPRISING A PLURALITY OF USER TERMINALS EACH CONTAINING A CHIP CARD READING DEVICE

BACKGROUND OF THE INVENTION

The invention is directed to a data exchange system, including a plurality of user terminals using a secret cipher.

The protection of data is playing an increasingly important part in modern data processing and communications systems. The quality of a system with respect to an adequate data protection is critically dependent upon the degree to which one succeeds in making access to the system possible only for authorized persons and, conversely, keeping unauthorized persons locked out with absolute certainty. A simple although not absolutely certain possibility for checking the access authorization to a system is, for example, to use passwords that are only known to the authorized user and that the user can change as often as he desires. Since there is the risk given passwords that unauthorized persons will find them out or hear them, additional protection measures are indispensible. One of these measures, for example, is the encoding and decoding of the transmitted information, a measure that is realizable in data processing systems, among other things, with the assistance of a chip card. With the increasing involvement of the chip card in data processing systems, however, an additional security risk again arises because chip cards can be relatively easily lost. Care must therefore be absolutely exercised to see that the chip card is protected against potential misuse in all instances when lost. The chip card is therefore designed such that the data stored in a protected chip card can only be accessed when the user previously inputs an identifier that is only stored in the chip card, for example, a personal identification number, referred to as a PIN.

A further security barrier can be erected with the assistance of the authentication of the chip card to the system. This authentication prevents an arbitrary subscriber from being authorized to access secret information in the system. A critical precondition for the authentication is a personal feature of the subscriber that cannot be copied. This non-copyable feature of the subscriber is achieved with the assistance of a secret cipher for the encoding and decoding that is known to the two partners, i.e., to the chip card on the one hand and to the system on the other hand, being known, namely, only to these two partners.

In a POS banking system on a chip card basis, it is assumed, for example, that secret data in the cashier terminal are stored in a separate security module, for example, in what is referred to as a security chip card. Given the employment of a symmetrical encoding algorithm, the same, secret terminal cipher must exist in all terminals. This cipher is required in order to calculate a common communication cipher from the card identification number of a customer card. The existence of a universal, secret cipher in the security module or, respectively, in the security chip card of every POS terminal of an overall system, however, is an extremely critical point and, so to speak, the vulnerable location of the system. A number of protective measures have therefore already been considered that make it more difficult to obtain knowledge of a secret, global cipher. According to a first protective measure, a single secret, global cipher K is replaced by a series of n different global ciphers Kl, Kn and, correspondingly, there are different terminal types. Should this cipher potentially become known, thus, the entire system is not jeopardized. However, a customer card must also contain n different ciphers KK1, ..., KKn of which respectively only one is valid at a specific terminal. A second protective measure likewise provides a plurality of ciphers Kl, ..., Kn that are cyclically changed at certain time intervals. For example, a plurality of terminal ciphers Klp, ..., Knp are valid in a certain time phase p. The appertaining customer ciphers KKlp, ..., KKnp, of course, must then be present in a customer chip card.

SUMMARY OF THE INVENTION

The object of the present invention, then, is to find an optimum solution for the protection of a global secret cipher that makes it practically impossible to ferret out the respectively valid global cipher.

This object is inventively achieved by using a secret cipher which is divided into two parts. Advantageous developments of the ivnention are recited in the subclaims. By splitting up the secret cipher into two sub-components whereof one sub-component is variable, correspondingly different, new secret ciphers can be derived in the periodic or regular re-formation of the variable part, so that, even if a cipher is ferreted out, this discovered cipher will very soon be superceded and thus, will be unusable. The secret cipher may be used in the authentication of chip cards, to protect access to the data exchange system.

BRIEF DESCRIPTION OF THE DRAWINGS

An exemplary embodiment of the invention shall be set forth in greater detail below with reference to the drawing, in which.

DESCRIPTION OF THE PREFERRED EMBODIMENT

Figure 1:
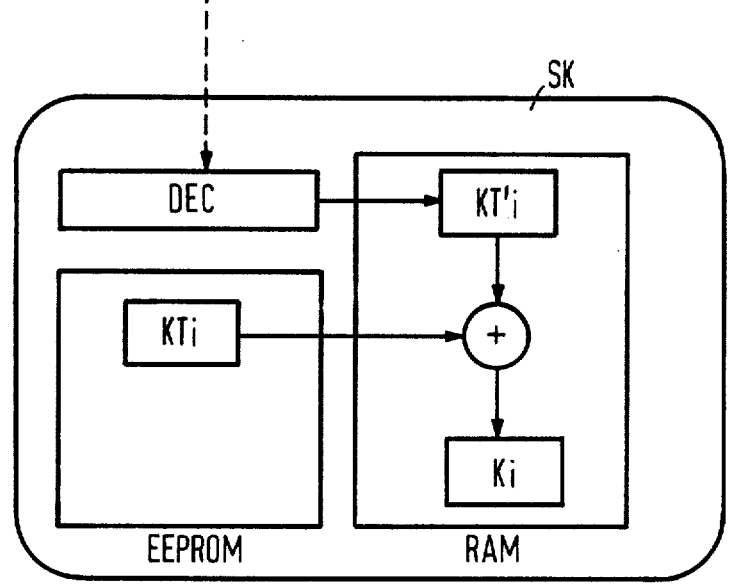
FIG. 1 is a circuit arrangement for generating a secret global cipher composed of two sub-components.

FIG. 1 shows those features of a security chip card SK in a user terminal that are essential for explaining the invention. The whole is based on the consideration that a global cipher should initially not be completely stored in the terminal for security reasons. A splitting of the secret global cipher Ki deposited in the security card into two terminal-associated sub-components KTi and KT'i is provided for this reasons. The first sub-component KTi resides protected in an erasable, programmable read-only memory EEPROM, whereas the second sub-component KT'i is transmitted into the security module of the terminal, i.e. into the security card SK, within the framework of the daily terminal logon procedure. The latter occurs in such fashion that an encoded, second sub-component E (KT'i) is supplied to a decoding stage DEC whose decoded output signal is stored in a first sub-area of a write-read memory RAM as second sub-component KT'i. Finally, the completely secret cipher Ki is calculated from the first sub-component KTi deposited in the read-only memory EEPROM and from the second sub-component KT'i transmitted into the write-read memory RAM and the result is deposited in a second sub-area of the write-read memory RAM.

Figure 2:
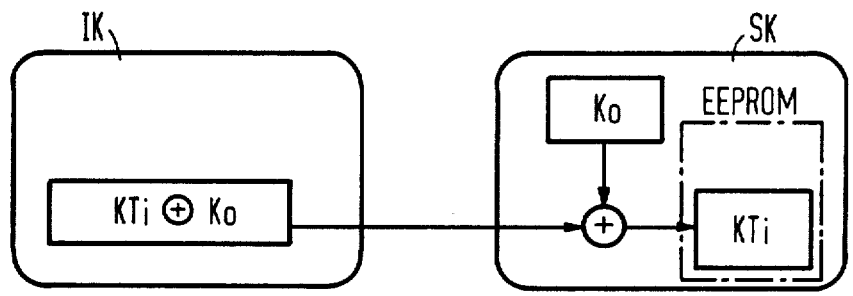
FIG. 2 is a modification of the circuit of FIG. 1 regarding one of the sub-components.
Figure 3:
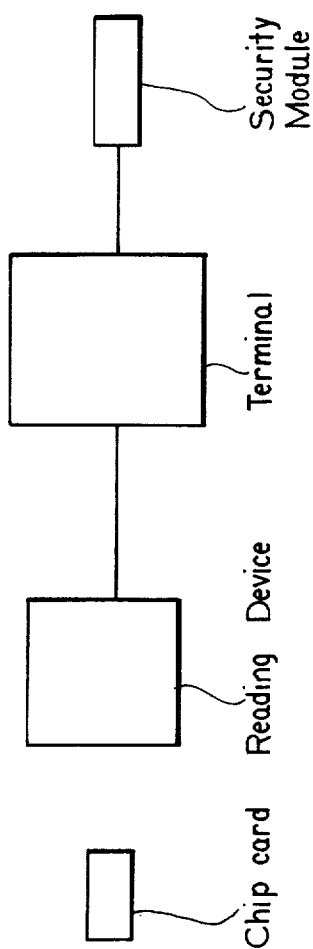

FIG. 2 shows a modification of the circuit of FIG. 1 insofar as the first sub-component KTi is not available a priori in the terminal, but is only generated in the framework of the initial start-up of a POS terminal. What is referred to as an initialization chip card IK is required for this procedure. When, for example, the terminal works with a security card SK, then an auxiliary cipher Ko is entered into it at the time of its personalization, when an individual PIN number is associated with the card. What is referred to as a pre-cipher KTi+Ko is then calculated with the assistance of this auxiliary cipher Ko and is entered into the initialization chip card IK. After mutual authentication between the security card SK and the initialization chip card IK, this pre-cipher KTi + Ko is transferred open-ended from the intitialization chip card IK to the security card SK. There, the first sub-component KTi is calculated, finally, from the pre-cipher KTi + Ko, and from the auxiliary cipher Ko that was already previously deposited, and is entered into the read-only memory EEPROM of the security card SK. Whether or not the generation of the first sub-component KTi of the global key carried out in this way in fact was executed error-free can be subsequently checked with a test chip card.

It will be apparent that various modifications and/or additions may be made in the apparatus of the invention without departing from the essential feature of novelty involved, which are intended to be defined and secured by the appended claims.

It is claimed:

1. A data exchange system comprising a plurality of terminals each containing a chip card reading device, a security module for storing a secret key, which key is identical for all terminals, said secret key (Ki) being formed of two sub-components (KTi, KT'i);

said security module having an erasable programmable read-only memory (EEPROM) for storing one sub-component (KTi);

a decoder means (DEC) provided in the security module;

said decoder means having an input for receiving an enciphered data block (E(Kt'i)) for the second sub-component (KT'i) from outside said security module;

said security module having a write-read memory (RAM), for receiving and storing the decoded output signals from said decoder means as a second subcomponent (KT'i) in a first sub-area of said write-read memory (RAM); and said security module having means for operating on said two sub-components (KTi, KT'i) to form a result which is deposited in a second sub-area of the read-write memory (RAM) as an overall key (Ki).

2. The data exchange system according to claim 1, including means for storing a randomly chosen auxiliary key (KO) in said security module, an initialization card (IK) for storing a pre-key (KTi+KO) which has been computed before from said auxiliary key (KO) and from the first subcomponent (KTi);

means for calculating said first sub-component (KTi) from the pre-key (KTi+KO) and from the auxiliary key (KO) and storing the said component in said erasable, programmable read-only memory (EEPROM), after mutual authentication between the security module and the initialization card (IK) and after transmission of the prekey into the security module.

3. The data exchange system according to claim 1 or 2, wherein said security module is fashioned as a plug-in security card (SK).

4. A method of protecting access to a data exchange system for which use of a secret key is necessary, comprising the steps of:

dividing said secret key into two components (KTi and KT'i), storing one of said components in a security module;

maintaining the other component outside of said security module; and supplying said other component to logic means in said security module for generating the complete secret key.

5. The method according to claim 4, including the steps of:

using an initialization card to store a pre-key calculated from said one component and from an auxiliary key;

calculating said one component from said pre-key and from said auxiliary key, stored in said security module; and storing said one component in the security module.

* * * * *